United States Patent [19]

Patterson et al.

[11] Patent Number: 5,278,883
[45] Date of Patent: Jan. 11, 1994

[54] LOW PRESSURE DROP SPACER FOR NUCLEAR FUEL ASSEMBLIES

[75] Inventors: John F. Patterson; Trond A. Bjornard, both of Richland, Wash.

[73] Assignee: Siemens Power Corporation, Richland, Wash.

[21] Appl. No.: 860,649

[22] Filed: Mar. 30, 1992

[51] Int. Cl.[5] .................................. G21C 3/34
[52] U.S. Cl. .................... 376/439; 376/438; 376/444
[58] Field of Search ............. 376/439, 441, 443, 438, 376/442, 444; 976/DIG. 77, DIG. 80

[56] References Cited

U.S. PATENT DOCUMENTS

| | | | |
|---|---|---|---|
| 3,654,077 | 4/1972 | Lass et al. | 176/78 |
| 4,077,843 | 3/1978 | Patterson et al. | 376/442 |
| 4,351,795 | 9/1982 | Nicholson | 376/442 |
| 4,726,926 | 2/1988 | Patterson et al. | 376/439 |
| 4,749,543 | 6/1988 | Crowther et al. | 376/443 |
| 4,756,878 | 7/1988 | King et al. | 376/439 |
| 4,873,051 | 10/1989 | Duncan et al. | 376/438 |
| 4,913,876 | 4/1990 | Lettau et al. | 376/444 |
| 5,084,237 | 1/1992 | Patterson | 376/442 |

Primary Examiner—Donald P. Walsh
Assistant Examiner—Meena Chelliah
Attorney, Agent, or Firm—Ira Lee Zebrak

[57] ABSTRACT

A low pressure drop spacer for positioning and retaining the fuel rods of a nuclear fuel assembly in which a plurality of upper and lower spring forks which extend through apertures in the side wall of the spacer into the assembly and through apertures in grid members which divide the assembly. The intersection and superposition of the spring forks, side wall and grid members form fuel rod passageways through which the fuel rods extend.

48 Claims, 10 Drawing Sheets

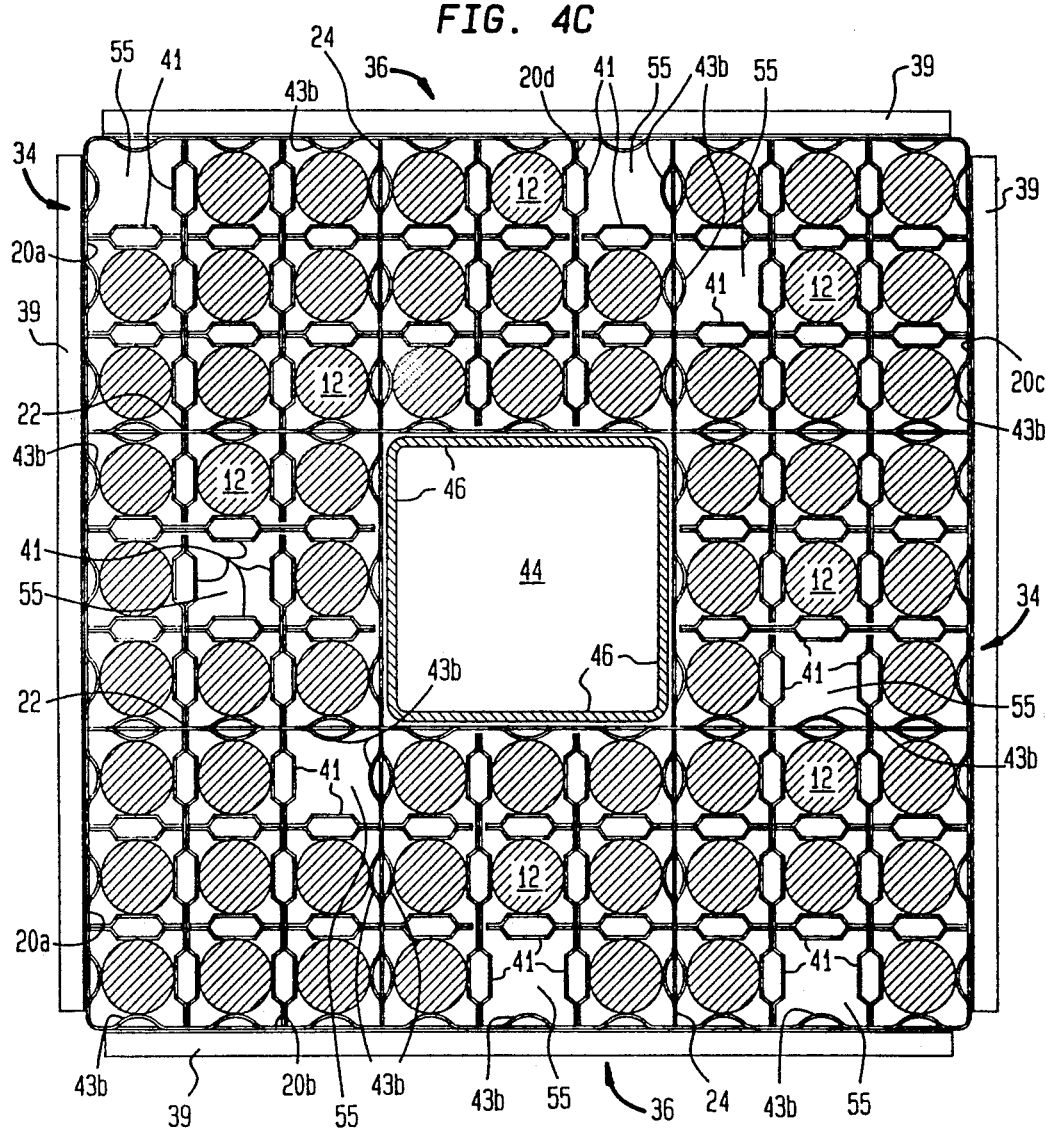

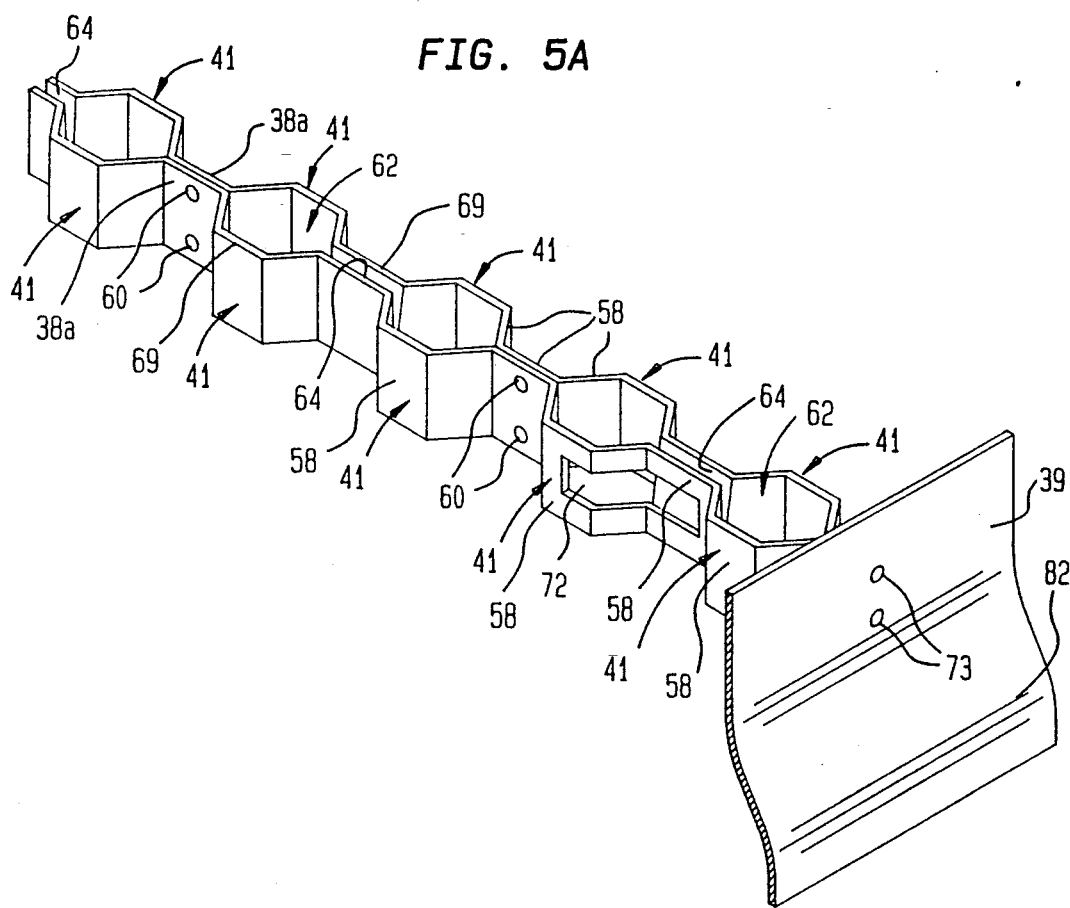

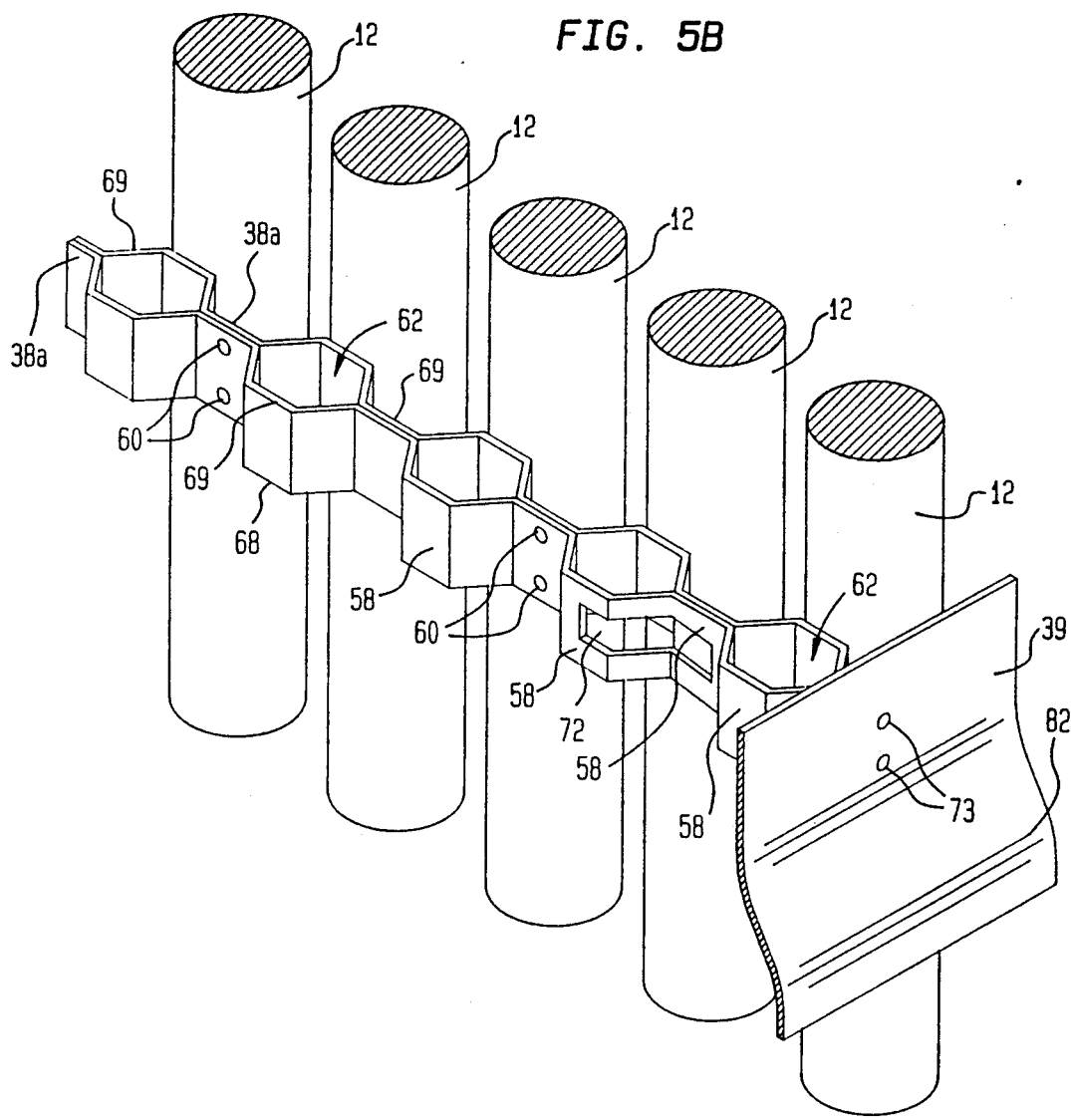

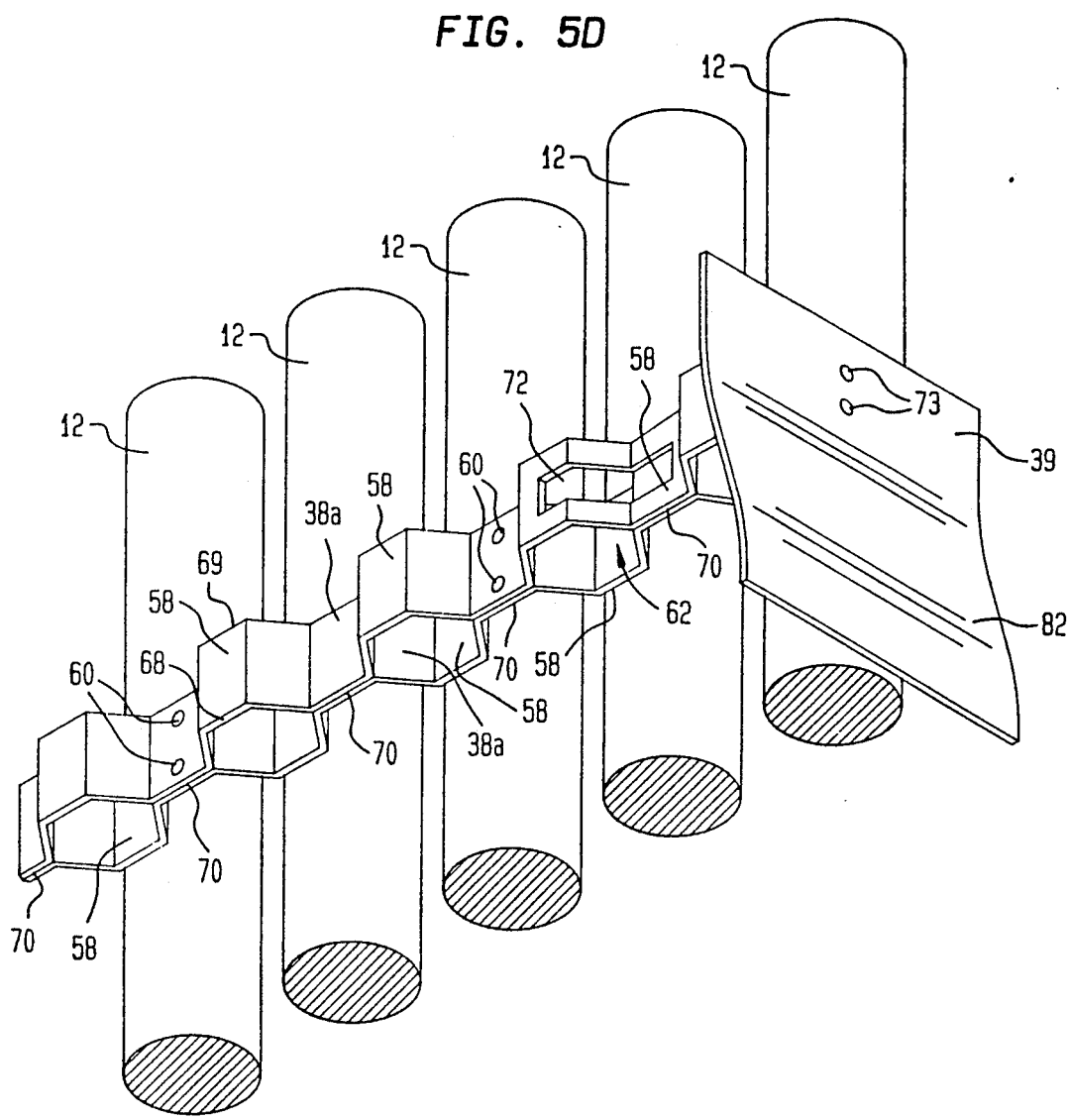

LOW PRESSURE DROP SPACER FOR NUCLEAR FUEL ASSEMBLIES

FIELD OF THE INVENTION

The present invention is directed to a spacer grid for use in nuclear reactor fuel assemblies. In particular, the invention is directed to a spacer grid for light water reactors wherein the spacer grid positions and holds the nuclear fuel rods in their intended positions while producing thermal-hydraulic characteristics favorable to heat transfer within the fuel assembly, as well as improving the fuel cycle cost by increasing nuclear fuel loading and optimizing fuel distribution.

BACKGROUND

In nuclear reactors intended for the generation of power, nuclear fuel assemblies are customarily of the rod type which are arranged in closely spaced parallel arrays in generally square configurations. An outer channel, usually square, surrounds the generally square configuration of fuel rods to form a fuel assembly. The means by which fuel rods are spaced ordinarily take the form of a spacer grid. An example of a spacer grid is shown and described in U.S. Pat. No. 3,654,077.

A common problem in typical boiling water reactors is that the central region of the fuel assemblies may be undermoderated and overenriched. In order to increase the flow of moderator, usually water, and to improve neutron moderation and economy, an elongated central water channel is provided which forms a centrally disposed path for the flow of moderator/coolant along the length of, but physically separated from, the fuel rods. The central water channel can have any cross-sectional area and/or geometry, positioned centrally and symmetrically within the outer channel, or asymmetrically displaced from the central axis within the outer channel, and can be oriented around its central axis so that its walls which extend the length of the assembly are either parallel or non-parallel to the walls of the outer channel. The central water channel can be a square or circular tube or array of such tubes extending along the length of the fuel assembly. An example of the square central water channel is shown in U.S. Pat. No. 4,913,876. Sufficient liquid coolant is circulated through the central channel or tubes to keep the contained coolant largely or completely in the liquid phase. The presence of liquid as contrasted to gaseous moderator in the central region of the fuel assembly increases the nuclear performance of the assembly by providing a greater number of hydrogen atoms which function, in part, to slow down neutrons and thereby increase the likelihood of further fissions. The moderator coefficient of reactivity, which is the change in reactor reactivity occurring when the moderator density changes, is thus affected by maintaining liquid as contrasted to gaseous moderator in the central region in the assembly.

As is well known, each fuel assembly for a boiling water type of water cooled reactor is typically enclosed by a square outer channel which confines the coolant which enters that fuel assembly to that particular fuel assembly until it exits the assembly at the top of the reactor core. The coolant passing through the fuel assembly consists of a mixture of liquid water and steam. At the bottom entrance of the fuel assembly, the coolant is liquid water having a temperature at/or approximately near its saturation temperature. As coolant flows upward through the assembly, power is transferred by the fuel rods to the coolant, steam is produced, and the fraction of steam in the coolant is increased. At the top of the fuel assembly, the coolant which has been heated by the fuel rods may be primarily steam. As a result of a high volume fraction of steam in the upper region of the reactor core, the upper region of the core becomes undermoderated and overenriched due to the presence of too few hydrogen atoms compared to the number of fissionable uranium or plutonium atoms. As a consequence, less than optimum uranium utilization results. The neutronic efficiency may be improved by decreasing the amount of fuel in the upper region of the core. One way in which this may be accomplished is by reducing the diameter of that portion of one or more of the fuel rods which extend into the upper portion of the core.

Current reactor and fuel assembly designs provide for fuel rods to be loaded during fuel fabrication from the top of the fuel assembly. If conventionally designed fuel assemblies are utilized, and if fuel rods with decreased diameters in the upper region of the core are to be loaded into the assembly, the fuel rods must be inserted into the assembly from the bottom. Subsequent to reactor operation, failed fuel rods must similarly be removed from the bottom of the assembly. A failed fuel assembly would first have to be upended which could cause the relocation of cracked fuel pellet fragments within fuel rods which have not failed. Such movement of cracked fuel fragments in rods which have not failed can cause such rods to sustain subsequent fuel cladding failure. The departure from normal procedures by upending fuel assemblies would add to design complexity of the upper and lower tie plates and the fuel rods, increase the fabrication costs of the fuel assembly, as well as increase the subsequent operational costs and risks associated with failed fuel rod replacement.

U.S. Pat. No. 5,084,237 issued to Patterson et al. on Jan. 28, 1992 which is incorporated by reference, relates to a side insertable spacer designed to permit rapid repair of irradiated fuel assemblies. The side insertable spacer is an example of a device which does not require upending of the fuel assemblies in order to remove the failed fuel rod(s). The side insertable spacer, however, must be used in conjunction with conventional spacers and tie plates.

As is well known, improvements in fuel cycle costs may be achieved by increasing the net amount of fuel in the fuel assembly. Although increasing the diameter of the fuel rods would produce such an increase, it would also result in the concomitant increase in the resistance to coolant flow within the assembly and an increase in pressure drop. Spacer grids also contribute significantly to the resistance to coolant flow. Furthermore, since there are several grid spacers which are located at selected intervals along the length of the fuel assembly, their total contribution to resistance to coolant flow affects the maximum quantity of nuclear fuel that may be utilized in a particular fuel assembly design. It would thus be an advantage over prior art designs if a spacer grid offered lower resistance to coolant flow thereby permitting an increase in fuel rod diameter and, concomitantly, an increase in the total amount of nuclear fuel within the assembly.

Once the maximum quantity of nuclear fuel has been placed within the fuel assembly, further improvements in nuclear reactor operations could be achieved if the amount of power that could be safely produced within the fuel assembly were increased. Since reactor power levels are limited by the amount of coolant flowing through the assembly as well as by local heat transfer conditions present at the surface of the fuel rods, it is highly desireable spacer grid offer as little resistance to coolant flow as is possible. It is well known that heat transfer and therefore power capability is enhanced if a continuous film of water is maintained on the surface of the nuclear fuel rods. It would therefore be an advantage over prior art designs if the spacer grid also aided in, or contributed to, maintaining a water film on the fuel rod surfaces. An example of a spacer/mixing grid which provides for circulation of cooling water about the fuel rods while offering low resistance to flow is found in U.S. Pat. No. 4,726,926 for a Mixing Grid issued to Patterson et al. which is incorporated by reference.

In addition to maintaining a water film on the surface of the fuel rods, it is also desirable to transfer liquid water present on the inner walls of the outer channel and the outer walls of the inner water channel to the surface of the fuel rods. In order to insert the outer channel in its proper position over the bundle of fuel rods, a significant clearance is provided between the outer surface of the spacer grid and the inner surface of the outer channel. This clearance permits significant coolant flow between the inner walls of the outer channel and the outer perimeter of the spacer grid. Such bypass flow is undesirable because it is not as effective in the transfer of the liquid film from the channel walls to the fuel rod surfaces as is flow which passes through the spacer grid. Bypass flow can be decreased by limiting the clearance between the spacer grid and channel walls or by sealing the clearance between the spacer grid and the channel walls. Either approach renders the grid spacer susceptible to damage during the insertion or the removal of the outer channel. Copending application Ser. No. 07/747,088, entitled Boiling Water Reactor Fuel Rod Assembly With Fuel Rod Spacer Arrangement describes a fuel rod spacer arrangement wherein the fuel rods can be easily loaded into the assembly. One design which facilitates the transfer of liquid condensed on the surrounding channel to the fuel rod surfaces while maintaining an adequate clearance between the spacer grid and channel is disclosed in U.S. Pat. No. 4,749,543. However, this design suffers from the limitations that it is complex, and since it permits bypass flow, not all of the liquid is removed from the channel walls. It would therefore be an advantage over prior art devices to more effectively reduce bypass flow and remove virtually all liquid present on the inner wall of the outer channel as well as directing it to the fuel rod surfaces.

Spacer grids, regardless of their design, remove or strip a portion of the liquid water which has condensed on the inner walls of the outer channel and outer wall of the central channel and transfer some of the condensed water to the fuel rod surfaces, thereby increasing the water film thickness on the fuel rods. Spacer grids also function to coalesce small liquid droplets present in the coolant flow into larger droplets and aid in directing greater quantities of such larger liquid droplets to the fuel rod surfaces contributing further to increasing the water film thickness on the fuel rods. It might thus appear that additional spacer grids could be placed at selected points along the length of the assembly to function as a flow stripper and transfer liquid coolant drops to the surface of the fuel rods. However, the use of additional spacer grids results in increases in pressure drop. It would thus be an advantage to provide a low pressure drop spacer grid and to position at least one additional low pressure drop spacer grid to reduce the distance between the spacers in the upper region of the core and enhance the formation of a water film on the fuel rods without increasing the pressure drop across the fuel assembly.

Despite advances in the art of fuel assembly and spacer grid designs, a need exists for a spacer grid which has a low pressure drop, improves local heat transfer and provides for maximum fuel loading, while accommodating changes in the diameter of individual fuel rods along the length of the fuel assembly.

OBJECTS OF THE INVENTION

It is an object of the present invention to provide a low pressure drop spacer for a light water reactor.

It is another object of the present invention to provide a method of using a low pressure drop spacer grid to increase the power capability of fuel assembly by improving local thermal conditions on the fuel rods.

It is another object of the present invention to provide a low pressure drop spacer which permits the amount of fuel that may be loaded into a fuel assembly to be increased.

It is yet another object of the present invention to provide a low pressure drop spacer which permits increased neutron moderation in the upper region of the core by accommodating reduced diameter fuel rods which extend into the upper portion of the core.

It is yet a further object of the present invention to provide a spacer grid which reduces the amount of bypass flow.

It is a further object of the present invention to provide a low pressure spacer which increases efficiency in reactor fuel cycle costs.

SUMMARY OF THE INVENTION

A low pressure drop spacer is disclosed for positioning and retaining the fuel rods of a nuclear fuel assembly, the fuel assembly being formed of parallel elongated fuel rods, the spacer having a perimeter strip which circumscribes a region within the assembly through which the fuel rods extend, the strip having an upstream edge and a downstream edge and being adapted to form first apertures positioned toward the upstream edge and second apertures positioned toward the downstream edge, the spacer further having grid members extending and arranged within the region to divide the region into subregions, the grid members being secured to the perimeter strips; each one of the grid members having an upstream edge and a downstream edge and being adapted to form first apertures positioned toward the upstream edge of the perimeter strip and second apertures positioned toward the downstream edge of the perimeter strip, the spacer further having a first spring fork comprising a first end strip and parallel pairs of first spring strips secured to the first end strip, each one of the parallel pairs of first spring strips extending through a corresponding one of the first apertures in the perimeter strip and a corresponding one of the first apertures in the grid members, the first fork positioned in a first plane extending in a first direction defined by the plurality of pairs of first spring strips, the spacer further having a second spring fork comprising a second end strip and parallel pairs of second spring strips secured to the second end strip, each one of the parallel pairs of second spring strips extending through a corresponding one of the second apertures in the perimeter strip and a corresponding one of the second apertures in the grid members, the second fork positioned in a second plane being substantially parallel to the first plane, the second plane extending in a second direction defined by said plurality of pairs of second spring strips such that the second spring fork is superposed on the first spring fork so as to form fuel rod passageways through which the fuel rods extend.

BRIEF DESCRIPTION OF THE DRAWINGS

FIG. 4C is a view looking down upon the low pressure drop spacer grid and fuel assembly broken away along line 4a in FIG. 2 and showing the fuel rods and both the upper spring forks and lower spring forks in their loaded positions;

FIG. 5A is a perspective fragmentary view looking down upon a portion of one spring fork shown in its unloaded position;

FIG. 5B is a perspective fragmentary view of the spring fork shown in FIG. 5A but in a loaded position with fuel rods;

FIG. 5D is a perspective fragmentary view looking up at the portion of the spring fork shown in FIG. 5B.

DETAILED DESCRIPTION

Figure 1:
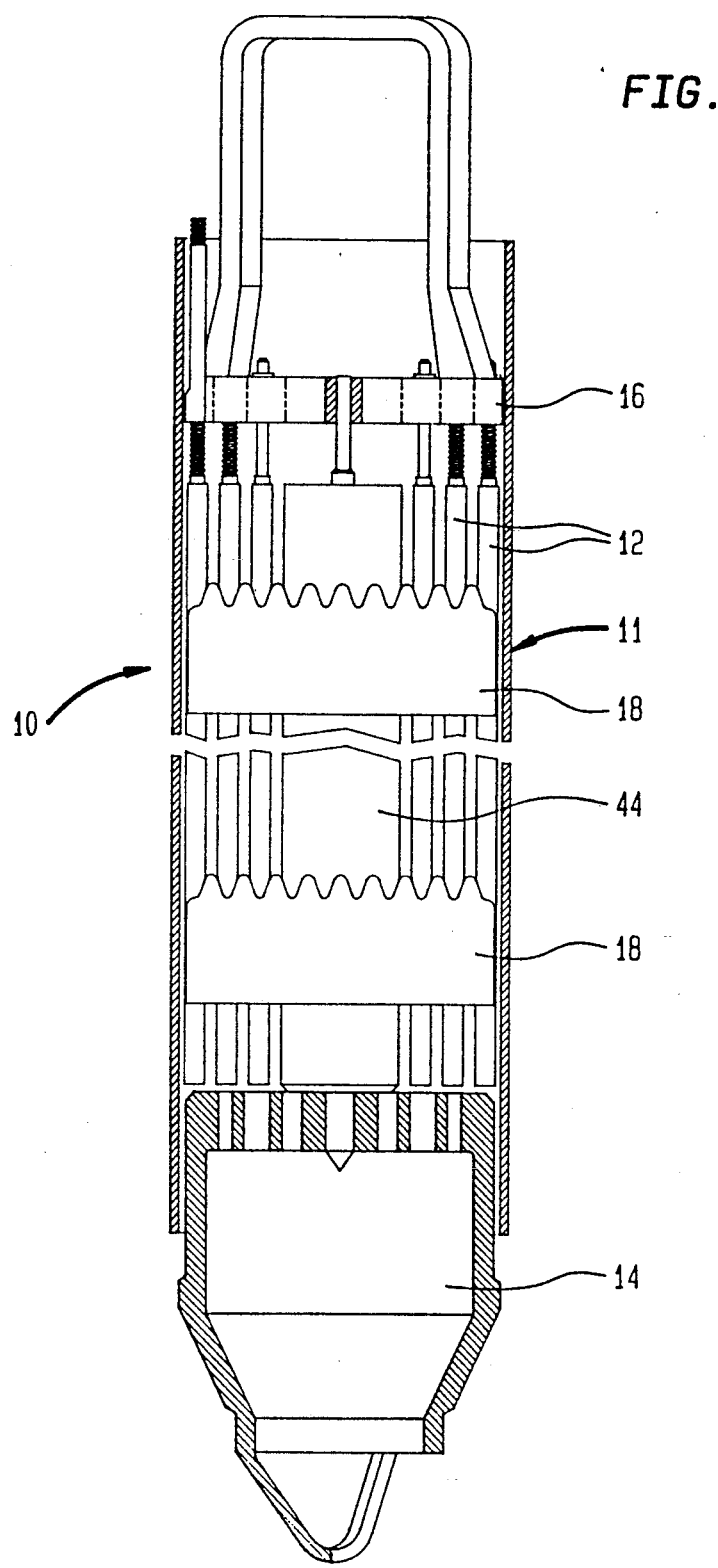
FIG. 1 is a sectional view along the length of a typical boiling water reactor fuel assembly employing the low pressure drop spacer of the present invention.

Referring to FIG. 1, a boiling water reactor fuel assembly is generally shown at 10 having elongated fuel rods 12 containing nuclear fuel pellets. The fuel rods are supported between a lower tie plate 14 and upper tie plate 16. Fuel rods 12 pass through low pressure drop spacer grids 18, only two of which are shown in this fragmentary view. Assuming present reactor designs, up to nine low pressure drop spacer grids could be used. Low pressure drop spacer grids 18 provide intermediate support of rods 12 over the length of fuel assembly 10 and maintain them in a spaced relationship while restraining them from lateral vibration. A central rectangular channel 44 is at the center of the array of fuel rods 12. Outer rectangular channel 11 is shown around the fuel rods 12 and spacers 18.

Figure 2:
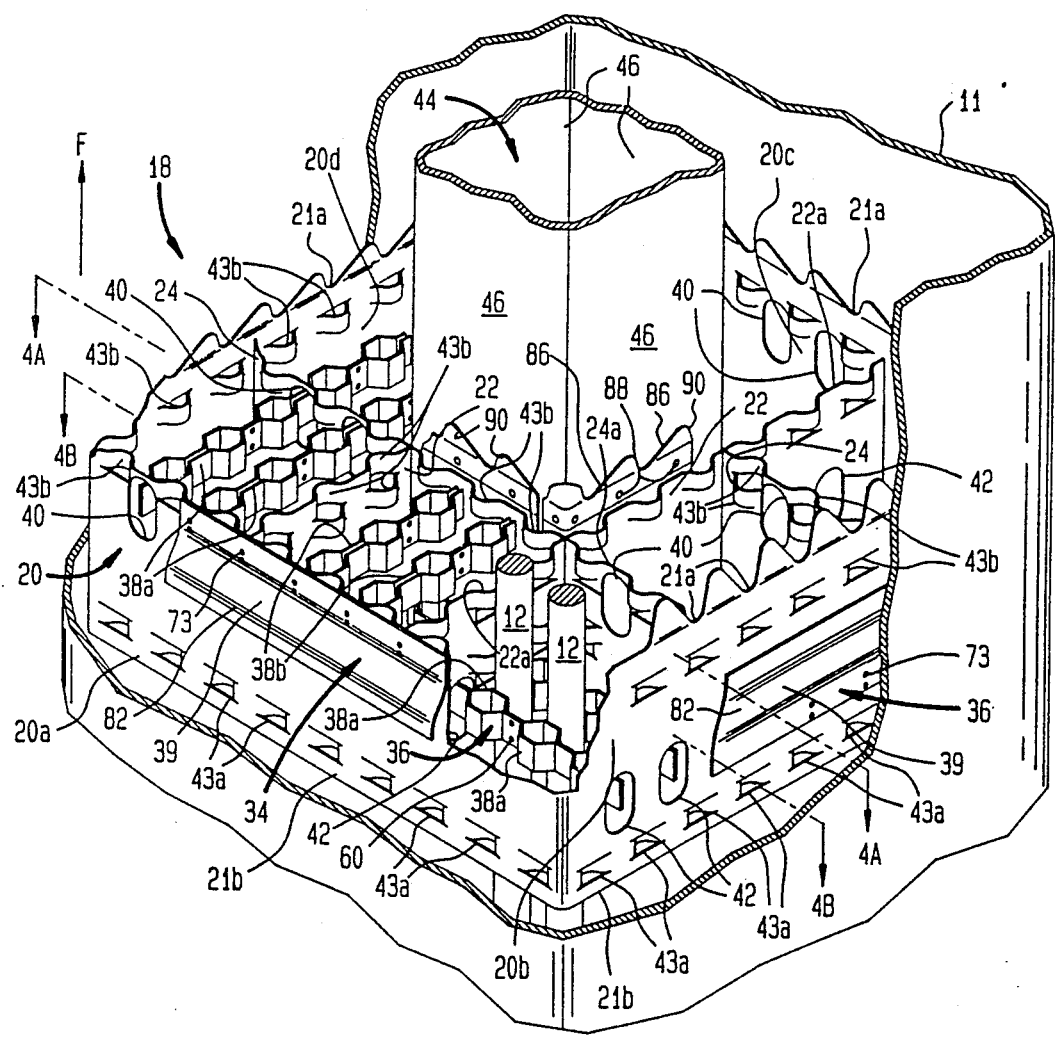
FIG. 2 is a perspective fragmentary view looking down upon one of the low pressure drop spacer grids in FIG. 1 but with most of the fuel rods removed.

FIG. 2 is a perspective fragmentary view looking from the side and down upon assembly 10 in FIG. 1 and shows one of the low pressure drop spacer grids 18 with the outer channel 11 partially removed. Assembly 10 houses a 9×9 fuel array although most of the fuel rods 12 are not shown in FIG. 2 for clarity of illustration.

Although reference is made in the specification to a 9×9 fuel rod array, such an array has been selected for illustrative purposes only. The present invention can be used with other arrays including, but not limited, to 8×8, 10×10, and 11×11.

Referring to FIG. 2, low pressure drop spacer grid 18 includes a perimeter strip 20 which is a band forming four walls 20a, 20b, 20c, and 20d. Each of walls 20a, 20b, 20c, 20d have a leading or upstream edge 21b and a trailing or downstream edge 21a. The direction of coolant flow through the assembly is shown by the arrow marked F in FIG. 2. Grid members 22 and 24 are arranged at right angles to one another and divide the region within perimeter strip into nine separate subregions. Grid members 22 and 24 are secured to perimeter strip 20. Grid members 22, 24 have a leading or upstream edge (not shown) as well as a trailing or downstream edge 22a, 24a, respectively. Both the upstream and downstream edges of the walls 20a, 20b, 20c, 20d as well as grid members 22 and 24 can be convexly contoured to decrease the resistance to coolant flow. Eight of the subregions house fuel rods 12 and the central region houses central water channel 44 which is formed by channel walls 46. Most of the fuel rods are not shown in FIG. 2 for clarity. A square central water channel 44 is shown in FIG. 2 although other shapes are known and can be used. Central channel walls 46 extend the length of fuel assembly 10 allowing water to flow through central water channel 44 from the bottom to the top of fuel assembly 10.

Perimeter strip walls 20a, 20b, 20c, and 20d, and grid members 22 and grid members 24 make up a basic egg-crate structure shown in FIG. 4. Zircaloy, an alloy of zirconium, is a preferred material for the egg-crate structure because of its low neutron absorption characteristics. Two of the most commonly known forms of zircaloy are Zircaloy 2 and Zircaloy 4 which are described in ASTM standard B350-91 (1991); compositions R60802 and R60804, respectively and is hereby incorporated by reference.

Figure 3:
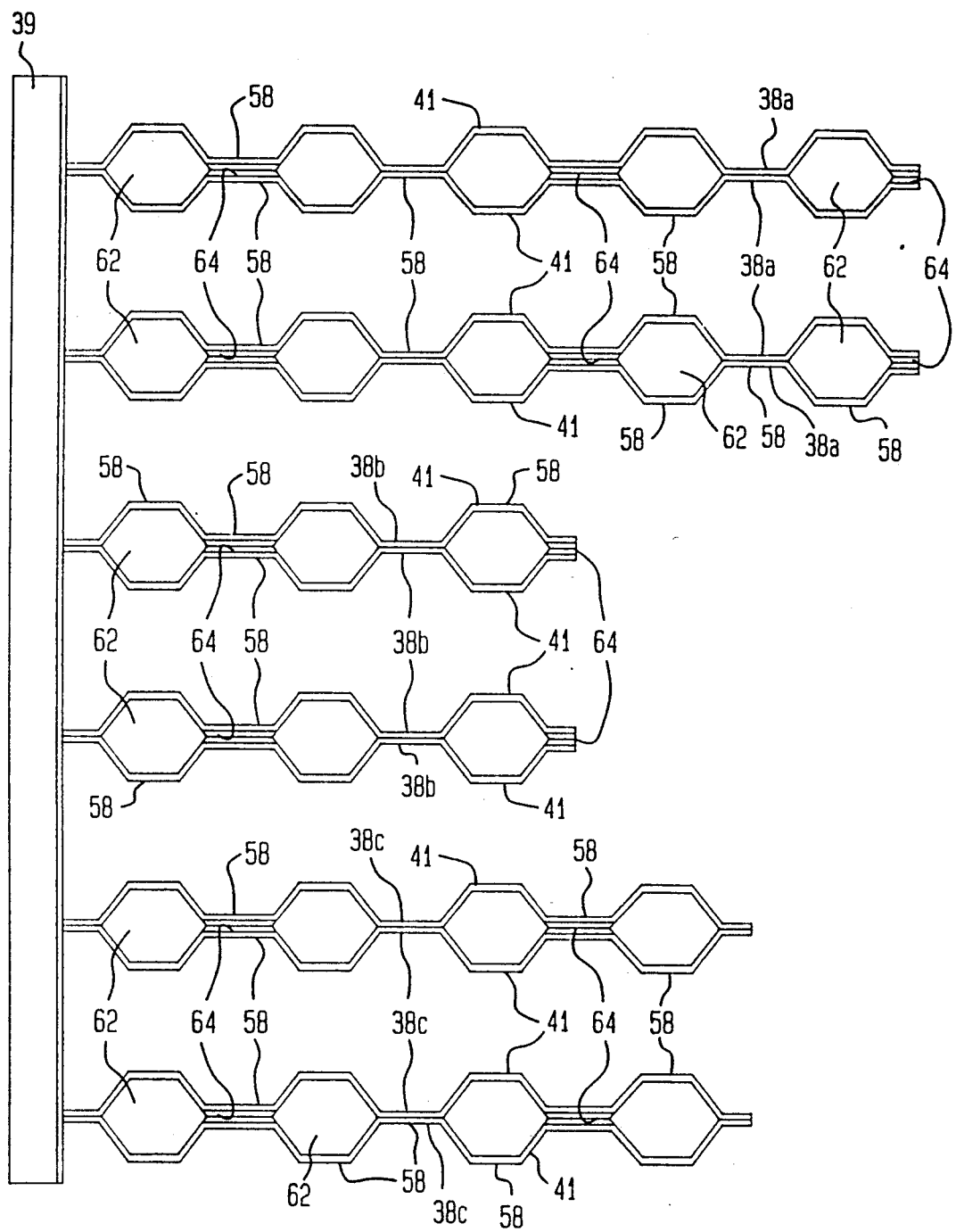
FIG. 3 is a top plan view of one spring fork which forms a part of the low pressure drop spacer grid assembly shown in FIG. 2.

Each low pressure drop spacer 18 includes four spring forks, two of which are lower spring forks 36, and two are the upper spring forks 34. Each spring fork is formed of six pairs of spring strips of three different lengths 38a, 38b, 38c attached to an end support 39 and is shown in FIG. 3.

Upper spring forks 34 extend into the egg-crate structure of the spacer through apertures 40 positioned in the upper portion of perimeter strip walls 20a, 20c and grid members 24. Shown in FIG. 2 is a portion of the upper spring fork 34 with spring strip pairs 38a which extend through apertures 40 in side wall 20a. Spring strip pairs 38a further extend through apertures 40 in grid member 24 and into the adjacent subregion. The length of spring strips 38a are such that they extend into but not completely through the adjacent subregion. Spring strips 38b of upper spring fork 34 extend through apertures 40 in side wall 20a and into the middle subregion. Although not shown in FIG. 2 for clarity, spring strips 38c of upper fork 34 similarly extend through apertures 40 in side wall 20a, into and through the corner subregion formed in part by walls 20a and 20b, and extend further through apertures 40 in grid member 24 into the next adjacent subregion.

Figure 4A:
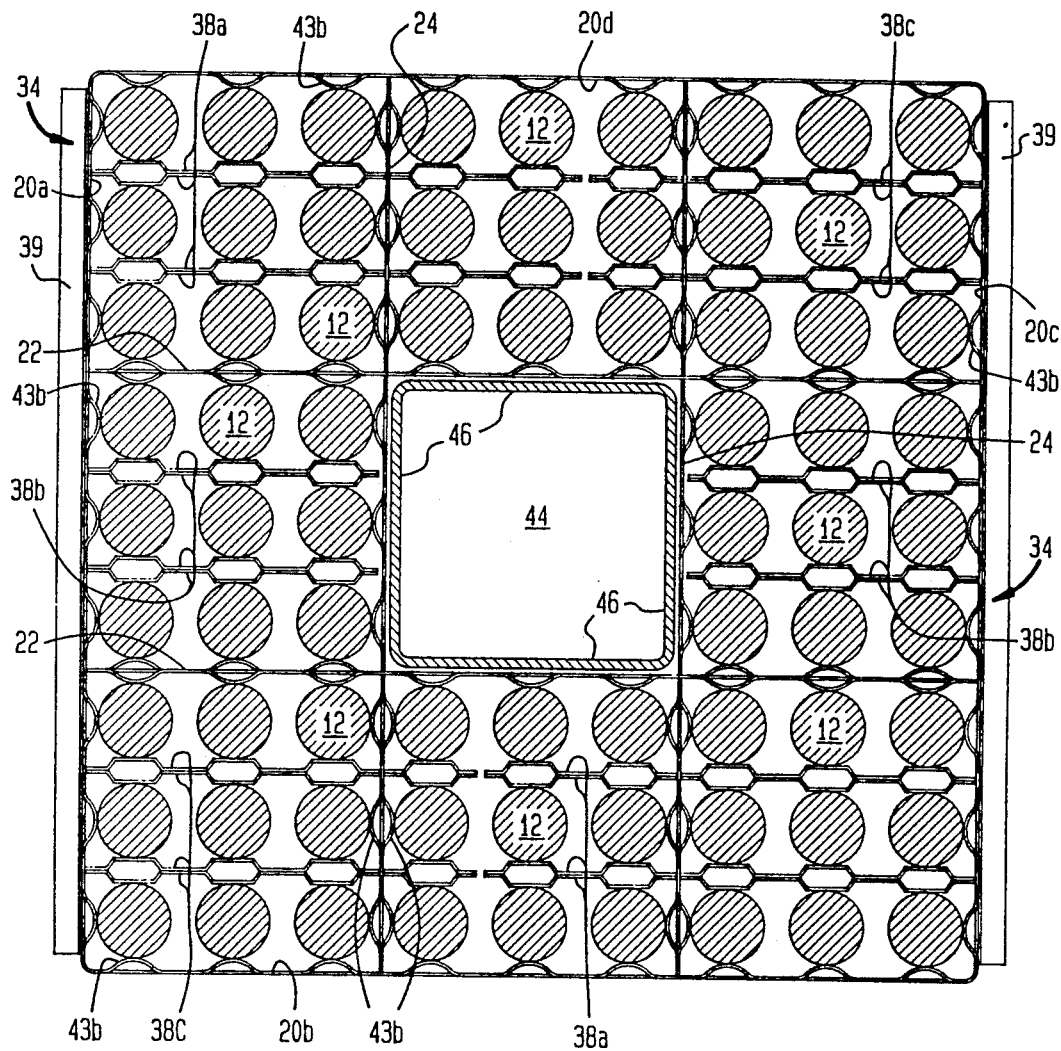
FIG. 4A is a sectional view of the low pressure drop spacer grid and fuel assembly taken along line 4a in FIG. 2 and showing all the fuel rods and the upper spring forks in their loaded position.

A second upper spring fork 34 (not shown in FIG. 2 for clarity) similarly extends into the egg-crate structure through apertures 40 in perimeter strip wall 20c. Both upper spring forks 34 are shown in FIG. 4A. Pairs of spring strips 38a, 38b and 38c extend into the subregions adjacent to sidewall 20c. As is further shown in FIG. 4A, two upper spring forks 34 are positioned in the fuel assembly in the same plane in which their spring strip pairs extend.

Figure 4B:
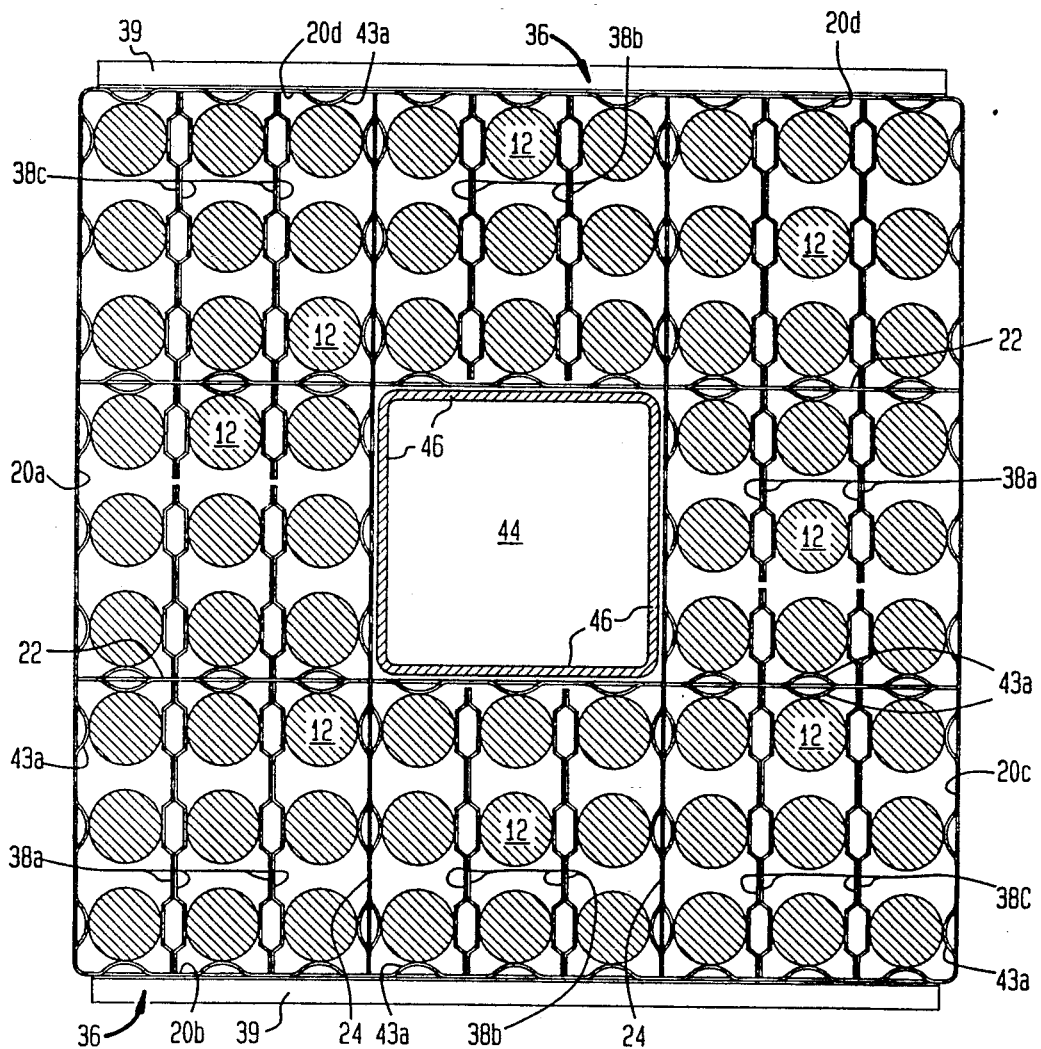
FIG. 4B is a sectional view of the low pressure drop spacer grid and fuel assembly taken along line 4b in FIG. 2 showing all the fuel rods and the lower spring forks in their loaded position.
Figure 5C:
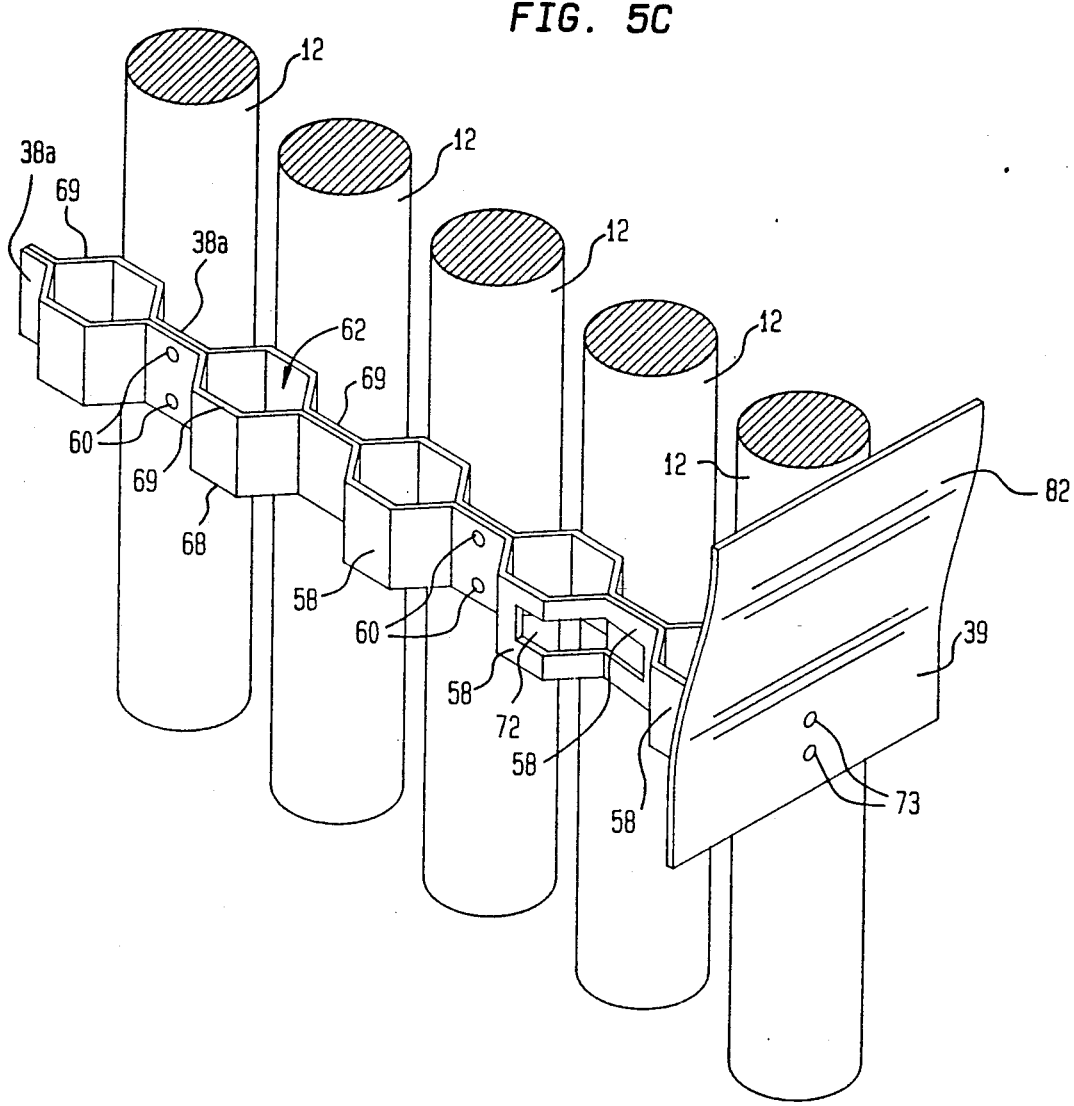
FIG. 5C is a perspective fragmentary view looking down upon a portion of another spring fork shown in a loaded position with fuel rods.

In addition to upper spring forks 34, lower spring forks 36 are provided which are positioned below the upper spring forks. Pairs of spring strips 38a, 38b and 38c of lower spring fork 36 extend through apertures 42 which are positioned in the lower or upstream portion of perimeter wall 20b and guide members 22 (FIGS. 2 and 4B). Apertures 40 in sidewalls 20a, 20c and grid members 24 are positioned at a higher axial location than apertures 42 in sidewalls 20b, 20d and grid members 22. Although not shown in FIG. 2 for clarity, a second lower spring fork 36 extends into the egg-crate structure through apertures 42 in sidewall 20d and through apertures 42 in guide members 22 (FIG. 4B). Each spring strip pair of both of the upper spring forks 34 and both of the lower spring forks 36 extend into the fuel assembly.

The two lower spring forks 36 are positioned in a plane which is parallel to the plane occupied the upper spring forks. As is shown in FIGS. 2, 4A and 4B, the spring strips of the lower spring forks extend in a direction orthogonal to the direction of the spring strips of the upper spring fork.

The intersection and superposition of spring forks 34, 36, grid members 22, 24, and perimeter strip 20 form fuel rod passageways 55 (FIG. 4C) through which fuel rods 12 extend. Seventy two passageways 55 are defined for the 9×9 fuel assembly shown in FIG. 2. Although a fuel rod occupies each passageway 55 in a fully loaded fuel assembly, one fuel rod from each of the eight subregions has been removed from the view shown in FIG. 4C for purposes of illustration.

Each spring strip 38 of each of spring forks 34, 36 has spring members 41 which act against fuel rods 12. FIG. 3 is a top plan view of the spring fork and shows the position of spring members 41 in each spring strip. At least one spring member 41 from each of upper spring fork 34 and lower spring fork 36 provide reaction loads in at least two different directions perpendicular to each other and restrain fuel rod 12 within passageway 55 against lateral vibration (FIG. 4C). Each fuel rod 12 is restrained in passageway 55 in four directions solely by spring members 41, or by spring members 41 in conjunction with dimples 43a and 43b which are formed in perimeter strips 20 and grid members 22, 24 (FIGS. 2 and 4C). Dimples 43b are positioned towards the upstream or trailing edges of perimeter strip 20 and grid members 22, 24, whereas dimples 43a are positioned towards the downstream or leading edge of perimeter strip 20 and grid members 22, 24. A dimple pair is formed by a dimple 43a and a dimple 43b. Each dimple pair is positioned at the same radial location in the fuel assembly. Dimples 43a and 43b are preferably of the "flow-through" type, i.e., open at their tops and bottoms to reduce the pressure drop.

Referring to FIG. 4C, each fuel rod 12 within the assembly is restrained within a passageway 55 by the combined action of either: (a) two spring members 41 and two dimple pairs; (b) three spring members and one dimple pair; or (c) four spring members. Although the present invention is shown and described for purposes of illustration with a square 9×9 fuel assembly, it is apparent to those skilled in the art that a fuel configuration other than a square or rectangular array can be selected and that the number of spring members and dimples which restrain each fuel rod within passageway 55 will vary.

FIGS. 5A-5D show one pair of spring strips 38a of the spring fork shown in FIG. 3. Spring strip pairs 38b and 38c have been omitted from FIGS. 5A-5D for clarity but have the same structure as spring strip pairs 38a except that they are shorter and have fewer spring members 41.

Referring to FIG. 5A, spring strips 38a have spring members 41 which are formed of convolutions 58 which alternate in opposite directions. Spring members 41 and convolusions 58 extend vertically to form a three sided groove or channel. Once loaded with fuel rods, convolusions 58 exert a retaining force on the fuel rods.

Pairs of spring strips 38a are joined by spot welds 60 between alternating abutting matching convolutions 58 with the opposing convolutions forming unobstructed flow spaces 62 as shown in FIG. 5A. Unobstructed flow spaces 62 formed by convolutions 58 are hexagonal in shape and allow coolant to flow unobstructed through low pressure drop spacer 18. The matching convolutions 58 which are not spot welded are positioned to form gaps 64 at trailing edge of spring strips 38a due to the shape of and resilience of spring strips 38a. The leading or upstream edge 68 of each spring strip 38a except for the leading edge of spring members 41 form abutting edges 70 (FIG. 5D). In a preferred embodiment, abutting edges of leading or bottom edge 68 are welded together. The preferred material for the spring fork is Inconel, a nickel alloy, which has high strength and exhibits less spring relaxation during irradiation. The strip material is preferably relatively thin, 8 to 12 mils in thickness, to minimize the resistance to coolant flow and to reduce the mass and volume of neutron absorbing material.

In the unloaded condition (without fuel rods inserted), convolutions 58 are not in line along a row, but rather displaced and tilted by the integral spring force provided by spring strips 38a. When a fuel rod 12 is positioned in a passageway 55, convolusions 58 exert a retaining force on fuel rods 12 and gap 64 is closed as shown in FIG. 5B.

The leading edge 68 and trailing edge 69 of each spring strip 38 can be convexly contoured to minimize the resistance to coolant flow and reduce the pressure drop. Abutting edges 70 can be convexly contoured to further reduce the pressure drop. In order to reduce the volume of neutron absorbing material, windows 72 may be formed in spring strips 38a.

Each pair of spring strips is attached to an end support 39 by welds 73. End support 39 extends vertically, and in a preferred embodiment, is contoured to provide a seal surface 82. The height of end support 39 extends beyond that of spring strip pairs 38a and provides spring resilience to keep seal surface 82 seated against the inner wall of outer channel 11 to reduce, if not eliminate, bypass flow. For each low pressure drop spacer 18, upper spring forks 34 and lower spring forks 36 are positioned at slightly different elevations relative to each other. Bypass low which would ordinarily pass between perimeter walls 20a, 20b, 20c, 20d of spacer 18 and the inner wall of outer channel 11 is reduced.

However, it may be desirable to permit bypass flow, particularly in the regions of the four corner fuel rods. The corner fuel rods of a fuel assembly are ordinarily undercooled because the coolant flow rate through the corner regions of the fuel assembly is usually low. In order to compensate for such low flow rate, the enrichment of the corner fuel rods is ordinarily reduced to prevent them from overheating. If bypass flow is selectively provided to the corner fuel rods, then the enrichment of such rods need not be reduced as much which results in a net increase in the linear power rate for such rods. By utilizing a spring fork with a seal surface which does not extend the full width of the fuel assembly, selectively limited bypass flow to the corner fuel rods and optimum flow in the corner subregions of the assembly can be obtained. Such optimum flow maximizes power production from the corner fuel rods as well as the other fuel rods in the assembly.

Spring forks 34, 36 are preferably made of a material much stronger than perimeter walls 20a, b, c, d and grid members 22 and 24 which form the egg-crate structure. Because limited relative motion is possible between the spring forks 34, 36 and the egg-crate structure, the possibility of damaging low pressure drop spacer 18 from the installation or removal of channel 11 is reduced. The possibility of damaging the spacer from the installation or removal of channel 11 is further reduced by making the spring forks of material(s) stronger and less embrittled by irradiation as well as more resilient than the material of the egg-crate structure. The possibility of damaging the spacer due to the installation or removal of the outer channel is reduced even further because relative motion between the seal and the outer channel as well as between the spring forks and fuel rods is permitted.

As stated above, one way in which improved uranium utilization as well as increased moderation in the upper region of the reactor core can be achieved is to decrease the diameter(s) of the fuel rods in the upper half of the reactor core. If one or more fuel rods fail during reactor operation, it is often desirable to replace such failed rods to avoid the costly premature discharge of the entire fuel assembly from the reactor. After the discharge from the reactor, repair of a fuel assembly involves the removal of the fuel assembly upper tie plate, upward withdrawal of the failed fuel rod(s), replacement of the failed rods, and replacement of the tie plate. A fuel assembly which utilizes a spacer grid design which accommodates fuel rods having reduced diameters at their upper end cannot be repaired using conventional methods to replace the failed fuel rod because the larger diameter lower portion of the fuel rod cannot be removed through the upper spacer grids. Repair methods of fuel assemblies utilizing fuel rods with such variable diameters involve upending the fuel assembly, and removing the lower instead of the upper tie plate. The upending of the fuel assembly is difficult and expensive, and can require nuclear fuel assembly redesign and subsequent operational risks.

Spring forks 34 and 36 are neither welded nor bolted to other elements of the low pressure drop spacer and may be easily removed. Both single and/or multidiameter fuel rods may be removed from the top of the fuel assembly due to the resilience of spring forks 34, 36 without having to first remove the spring forks. If as a result of reactor operations, one or more fuel rods undergo physical changes or deformations which prohibit removal from the fuel assembly, the present invention makes conventional repair methods possible for a fuel assembly with or without reduced fuel rod diameters. According to the present invention, and referring to FIG. 2, the spring forks 34, 36 which restrain the failed fuel rods 12 are removed from the egg-crate structure.

The removal of the spring forks to such failed fuel rods enables the upward withdrawal of failed fuel rods without damage to the fuel assembly or the spacer grid. After fuel rod replacement, spring forks 34, 36 are reinserted into the egg-crate structure.

Low pressure drop spacer grid 18 is secured to the central water channel by any conventional method. In a preferred embodiment, retainer strips 86 are secured to central water channel walls 46 by spot welds 88 at locations just below and above the desired axial position of spacer grid 18. Four retainer strips 86 are located just above spacer grid 18 (two are shown in FIG. 2) and have flow tabs 90 extending into the coolant stream which serve the additional function of directing liquid condensing on central water channel walls 46 towards fuel rods 12 where it can collect as a water film on the rods and thereby improve local heat transfer. Retainer strips are similarly positioned and secured just below the axial position of spacer grid 18.

As stated above, the present invention has several advantages. The low pressure drop spacer enables the use of larger fuel rod diameters improving the fuel cycle cost. Increased moderation of the fuel assembly is achieved by decreasing the diameters of the fuel rods in the upper portion of the core which improves the fuel cycle cost by approximately $20/kg equivalent fuel weight. Replacement of conventional fuel rods or fuel rods in assemblies incorporating reduced diameter fuel rods in the upper region of the fuel assembly is achieved without damage to the spacer or the other fuel rods. The power capability of the fuel assembly is increased by improving the transfer of condensing liquid water from the surrounding outer channel and central water channel to the fuel rod surfaces. Because of the reduced pressure drop at least one extra spacer can be installed within a fuel assembly which decreases the span between spacer grids in the upper region of the core, and as a result, improves even further the heat transfer to the coolant.

While the foregoing description and drawings represent the preferred embodiments of the present invention, it will be apparent to those skilled in the art that various changes and modifications may be made therein without departing form the true spirit and scope of the present invention.

We claim:

1. A low pressure drop spacer for positioning and retaining the fuel rods of a nuclear fuel assembly, said fuel assembly being formed of a plurality of parallel elongated fuel rods, comprising:

a perimeter strip which circumscribes a region within the assembly through which the fuel rods extend, the strip having an upstream edge and a downstream edge, the strip being adapted to form a plurality of first apertures positioned toward the upstream edge and a plurality of second apertures positioned toward the downstream edge;

a plurality of grid members extending within the region and arranged within the region to divide the region into a plurality of subregions, the grid members being secured to the perimeter strips; each one of the plurality of grid members having a grid upstream edge and a grid downstream edge, the grid members being adapted to form a plurality of first apertures positioned toward the upstream edge of the perimeter strip and a plurality of second apertures positioned toward the downstream edge of the perimeter strip;

a first spring fork comprising a first end strip and a plurality of parallel pairs of first spring strips secured to the first end strip, each one of the parallel pairs of first spring strips extending into the region and through a corresponding one of the plurality of first apertures in the perimeter strip and further extending through a corresponding one of the plurality of the first apertures in the grid members, the first fork positioned in a first plane extending in a first direction defined by the plurality of pairs of first spring strips;

a second spring fork comprising a second end strip and a plurality of parallel pairs of second spring strips secured to the second end strip, each one of the parallel pairs of second spring strips extending into the region and through a corresponding one of the plurality of second apertures in the perimeter strip and further extending through a corresponding one of the plurality of the second apertures in the grid members, the second fork positioned in a second plane substantially parallel to said first plane, said second plane extending in a second direction defined by said plurality of pairs of second spring strips such that the second spring fork is superposed on the first spring fork so as to form fuel rod passageways through which the fuel rods extend.

2. The spacer as in claim 1 wherein the parallel pairs of first strips are provided with first spring members which act against said fuel rods within the fuel rod passageways.

3. The spacer as in claim 2 wherein the parallel pairs of second spring strips are provided with second spring members which act against said fuel rods within the fuel rod passageways.

4. The spacer as in claim 3 wherein the perimeter strip has a plurality of perimeter strip dimple pairs comprising a first perimeter dimple and a second perimeter dimple, the first perimeter dimple being positioned toward the upstream edge of the perimeter strip, and the second perimeter dimple being positioned toward the downstream edge of the perimeter strip.

5. The spacer as in claim 4 wherein the grid members have a plurality of grid member dimple pairs comprising a first grid dimple and a second grid dimple, the first grid dimple being positioned toward the upstream edge of the grid member, and the second grid dimple being positioned toward the downstream edge of the grid member.

6. The spacer as in claim 5 wherein at least one of the first perimeter dimples and second perimeter dimples and the first grid dimples and the second grid dimples is adapted to form an opening for the passage of coolant.

7. The spacer as in claim 6 having two first spring forks.

8. The spacer as in claim 6 having two second spring forks.

9. The spacer as in claim 6 having two first spring forks and two second spring forks.

10. The spacer as in claim 9 wherein each of the first spring forks has six pairs of spring strips.

11. The spacer as in claim 10 wherein each of the second spring forks has six pairs of spring strips.

12. The spacer as in claim 11 wherein each pair of spring strips is attached to the end strip at a right angle.

13. The spacer as in claim 12 wherein at least one of the first spring members and the second spring members further have convolutions which alternate in abutting and in opposite directions and which extend to form a hexagonal channel for the unobstructed flow of coolant.

14. The spacer as in claim 13 wherein each one of the parallel pairs of the first spring strips and each one of the parallel pairs of the second spring strips are secured together at alternating abutting convolutions.

15. The spacer as in claim 14 wherein the spring strips are made of a springy material.

16. The spacer as in claim 15 wherein the spring strips have cutouts.

17. The spacer as in claim 16 wherein the first end strip of the first spring fork further includes a seal means to direct coolant from outside the region through which the fuel rods extend into the region.

18. The spacer as in claim 17 wherein the second end strip of the second spring fork further includes a seal means to direct coolant from outside the region through which the fuel rods extend into the region.

19. The spacer as in claim 18 wherein the means for sealing is the first end strip which is adapted to have a contoured seal surface.

20. The spacer as in claim 19 wherein the means for sealing further includes the second end strip which is adapted to have a contoured seal surface.

21. The spacer of claim 20 wherein the perimeter strip is made of zircaloy.

22. The spacer of claim 21 wherein the grid members are made of zircaloy.

23. The spacer of claim 22 wherein the spring forks are made of Inconel.

24. A nuclear fuel assembly for boiling water reactors, the assembly having a plurality of elongated fuel rods supported between a lower tie plate positioned toward the bottom of the assembly and an upper tie plate positioned toward the top of the assembly;

an outer channel surrounding the plurality of fuel rods for conducting coolant/moderator about the fuel rods from the bottom of the assembly toward the top of assembly;

an inner channel having at least one wall for conducting coolant/moderator through the inner channel from the bottom of the assembly toward the top of the assembly; and at least one low pressure drop spacer for positioning and retaining the fuel rods, the spacer comprising:

a perimeter strip which circumscribes a region within the assembly through which the fuel rods extend, the strip having an upstream edge and a downstream edge, the strip being adapted to form a plurality of first apertures positioned toward the upstream edge and a plurality of second apertures positioned toward the downstream edge;

a plurality of grid members extending within the region and arranged within the region to divide the region into a plurality of subregions, the grid members being secured to the perimeter strips; each one of the plurality of grid members having a grid upstream edge and a grid downstream edge, the grid members being adapted to form a plurality of first apertures positioned toward the upstream edge of the perimeter strip and a plurality of second apertures positioned toward the downstream edge of the perimeter strip;

a first spring fork comprising a first end strip and a plurality of parallel pairs of first spring strips secured to the first end strip, each one of the parallel pairs of first spring strips extending into the region and through a corresponding one of the plurality of first apertures in the perimeter strip and further extending through a corresponding one of the plurality of the first apertures in the grid members, the first fork positioned in a first plane extending in a first direction defined by the plurality of pairs of first spring strips;

a second spring fork comprising a second end strip and a plurality of parallel pairs of second spring strips secured to the second end strip, each one of the parallel pairs of second spring strips extending into the region and through a corresponding one of the plurality of second apertures in the perimeter strip and further extending through a corresponding one of the plurality of the second apertures in the grid members, the second fork positioned in a second plane substantially parallel to said first plane, said second plane extending in a second direction defined by said plurality of pairs of second spring strips such that the second spring fork is superposed on the first spring fork so as to form fuel rod passageways through which the fuel rods extend.

25. The fuel assembly as in claim 24 wherein the parallel pairs of first strips are provided with first spring members which act against said fuel rods within the fuel rod passageways.

26. The fuel assembly as in claim 25 wherein the parallel pairs of second spring strips are provided with second spring members which act against said fuel rods within the fuel rod passageways.

27. The fuel assembly as in claim 26 wherein the perimeter strip has a plurality of perimeter strip dimple pairs comprising a first perimeter dimple and a second perimeter dimple, the first perimeter dimple being positioned toward the upstream edge of the perimeter strip, and the second perimeter dimple being positioned toward the downstream edge of the perimeter strip.

28. The fuel assembly as in claim 27 wherein the grid members have a plurality of grid member dimple pairs comprising a first grid dimple and a second grid dimple, the first grid dimple being positioned toward the upstream edge of the grid member, and the second grid dimple being positioned toward the downstream edge of the grid member.

29. The fuel assembly as in claim 28 wherein at least one of the first perimeter dimples and second perimeter dimples and the first grid dimples and the second grid dimples is adapted to form an opening for the passage of coolant.

30. The fuel assembly as in claim 29 having two first spring forks.

31. The fuel assembly as in claim 29 having two second spring forks.

32. The fuel assembly as in claim 29 having two first spring forks and two second spring forks.

33. The fuel assembly as in claim 32 wherein each of the first spring forks has six pairs of spring strips.

34. The fuel assembly as in claim 33 wherein each of the second spring forks has six pairs of spring strips.

35. The fuel assembly as in claim 34 wherein each pair of spring strips is attached to the end strip at a right angle.

36. The fuel assembly as in claim 35 wherein at least one of the first spring members and the second spring members further have convolutions which alternate in abutting and in opposite directions and which extend to form a hexagonal channel for the unobstructed flow of coolant.

37. The fuel assembly as in claim 36 wherein each one of the parallel pairs of the first spring strips and each one of the parallel pairs of the second spring strips are secured together at alternating abutting convolutions.

38. The spacer as in claim 37 wherein the spring strips are made of a springy material.

39. The spacer as in claim 38 wherein the spring strips have cutouts.

40. The fuel assembly as in claim 39 wherein the first end strip of the first spring fork further includes a first seal means to seal a flow space existing between the outer channel and the perimeter strip.

41. The fuel assembly as in claim 40 wherein the second end strip of the second spring fork further includes a second seal means to seal a flow space existing between the outer channel and the perimeter strip.

42. The fuel assembly as in claim 41 wherein the first means for sealing is a contoured surface formed from the first end strip.

43. The fuel assembly as in claim 42 wherein the second means for sealing is a contoured surface formed from the second end strip.

44. The spacer of claim 43 wherein the perimeter strip is made of zircaloy.

45. The fuel assembly of claim 44 wherein the grid members are made of zircaloy.

46. The fuel assembly of claim 45 wherein the spring forks are made of Inconel.

47. The fuel assembly as in claim 45 further including a retainer strip means for securing the at least one low pressure drop spacer to the inner channel.

48. The fuel assembly as in claim 47 wherein the retainer strip means further includes inner channel wall flow tab means extending into the region to direct liquid condensing on the inner channel walls toward the fuel rods.

* * * * *